US009668623B2

(12) United States Patent
Pirelli (10) Patent No.: US 9,668,623 B2
(45) Date of Patent: Jun. 6, 2017

(54) WATERLESS TOILET SYSTEM AND METHOD WITH VENTILATION CONTROL

(71) Applicant: Convergent Market Research, Inc., Austin, TX (US)

(72) Inventor: Thomas Pirelli, Jupiter, FL (US)

(73) Assignee: Convergent Market Research, Inc., Austin, TX (US)

( * ) Notice: Subject to any disclaimer, the term of this patent is extended or adjusted under 35 U.S.C. 154(b) by 172 days.

(21) Appl. No.: 14/571,056

(22) Filed: Dec. 15, 2014

(65) Prior Publication Data

US 2016/0100723 A1    Apr. 14, 2016

Related U.S. Application Data

(60) Provisional application No. 61/963,762, filed on Dec. 14, 2013.

(51) Int. Cl.
*E03D 9/04* (2006.01)
*A47K 11/02* (2006.01)

(52) U.S. Cl.
CPC .............. *A47K 11/02* (2013.01); *E03D 9/04* (2013.01)

(58) Field of Classification Search
CPC ...................................................... E03D 9/04
USPC .......................................... 4/209 R–209 FF
See application file for complete search history.

(56) References Cited

U.S. PATENT DOCUMENTS

| 3,054,117 | A | 9/1962 | Cella |
| 3,184,761 | A | 5/1965 | Broughton |
| 3,965,922 | A | 6/1976 | McCornack |
| 4,870,709 | A | 10/1989 | Thornton, Jr. et al. |
| 4,922,557 | A | 5/1990 | Harding et al. |
| 5,344,085 | A | 9/1994 | Hofseth |
| 5,454,936 | A | 10/1995 | Ask et al. |
| 5,991,931 | A | 11/1999 | Hawkins et al. |
| 6,101,641 | A | 8/2000 | Hawkins et al. |

OTHER PUBLICATIONS

International Search Report and Written Opinion of the International Searching Authority in International Patent Application PCT/US2015/065650, 9 pages.

*Primary Examiner* — Lori Baker
(74) *Attorney, Agent, or Firm* — Russell D. Culbertson; The Culbertson Group, P.C.

(57) ABSTRACT

A toilet system includes a transport conduit, a flush member, an outer seal element with one or more ventilation passages there through, and an actuator system. All of these components may be mounted on a support structure which is installed on the slab or other foundation in the area of a toilet room and adjacent to a wall of the toilet room. A holding tank is located on the opposite side of the toilet room exterior wall from the support structure or other arrangement for supporting the transport conduit and other components of the system. The holding tank includes a ventilation stack and fan to induce airflow through the toilet system. The flush member and the actuator system cooperate to move excreta collected in the transport conduit to the holding tank. The outer seal element and actuator system cooperate to maintain a desired seal between the transport conduit and holding tank.

19 Claims, 7 Drawing Sheets

WATERLESS TOILET SYSTEM AND METHOD WITH VENTILATION CONTROL

CROSS-REFERENCE TO RELATED APPLICATION

Applicant claims the benefit, under 35 U.S.C. §119(e), of U.S. Provisional Patent Application No. 61/963,762 filed Dec. 14, 2013, and entitled "Waterless Toilet." The entire content of this provisional application is incorporated herein by this reference.

TECHNICAL FIELD OF THE INVENTION

The invention relates to toilet systems which remove waste without the use of water, and, more particularly, to a waterless toilet system with a ventilation arrangement for significantly reducing or eliminating odors which may enter the toilet room from the toilet system. The invention encompasses both toilet system apparatus and methods.

BACKGROUND OF THE INVENTION

Toilet systems have traditionally relied on water to remove waste from the commode and transport the waste on to a collection system. However, even where a water supply is available, it may be undesirable to use potable water to remove and transport waste in toilet and sanitation systems.

Various different types of waterless or dry toilet systems have been developed for use mainly in areas having no suitable water supply. Many of these waterless toilet systems require a collection or composting tank below the commode. This prior art arrangement requires significant excavation for ground floor commodes. Collection or composting tanks below the commode also have poor or difficult access for clean out. Other waterless toilet systems rely on complex vacuum systems and/or mechanical systems and are not suited for many applications in which waterless toilets could be advantageous. Many prior waterless toilet systems allow odors from collected waste to enter the toilet room and the rest of the structure in which the toilet room is situated.

There remains a need for a toilet system which is operable without water, relies on only simple and robust mechanical systems, and reduces or eliminates the escape of collected waste odors into the toilet room.

SUMMARY OF THE INVENTION

The present invention encompasses a toilet system which removes waste without the use of water and provides ventilation to significantly reduce or eliminate odors escaping from the system into the toilet room. The invention also encompasses methods of transporting waste in a toilet system.

A toilet system according to one embodiment includes a transport conduit, a flush member, an outer seal element with one or more ventilation passages there through, and an actuator system. All of these components may be mounted on a support structure which may be installed on a foundation slab or other foundation in a toilet room and adjacent to a wall of the toilet room. A holding tank is located on the opposite side of the toilet room wall from the support structure or other arrangement for supporting the transport conduit and other components of the system. The holding tank includes a ventilation stack and fan to induce airflow through the toilet system. The flush member and the actuator system cooperate to move excreta collected in the transport conduit to the holding tank for drying or other processing, while the outer seal element and actuator system cooperate to maintain a desired seal between the discharge conduit and holding tank and to break the seal only temporarily to permit excreta to be discharged from the transport conduit to the holding tank. The ventilation passages through the outer seal element facilitate ventilation from the interior of the transport conduit to the holding tank to reduce or eliminate odors which might otherwise emanate from the toilet system to the toilet room.

The transport conduit includes a discharge end, an inner end, and a commode opening located between the discharge end and inner end. The flush member is movable between a retracted position and an extended position within the transport conduit. In the retracted position, a sealing end of the flush member resides between the commode opening and the inner end of the transport conduit. However, in the extended position the sealing end of the flush member resides approximately at the discharge end of the transport conduit. This position "approximately at the discharge end of the transport conduit" will be described further below in connection with the drawings.

The outer seal element is also movable between different positions relative to the discharge end of the transport conduit. In particular, the outer seal element is movable between a sealing position and a displaced position. When in the sealing position, the outer seal element seals the discharge end of the transport conduit. In the displaced position however, the outer seal element is separated from the discharge end of the transport conduit. Each ventilation passage in the outer seal element allows airflow from an interior of the transport conduit when the outer seal element is in the sealing position. This airflow may be induced by the fan and ventilation stack arrangement associated with the holding tank.

The actuator system is operable to move the flush member and the outer seal element between their respective limits of travel in a flush cycle. In the flush cycle the flush member first moves from its retracted position to its extended position while the outer seal element moves from its sealing position to its displaced position. As the flush member moves to its extended position and the outer seal element moves to its displaced position, the actuator system preferably ensures that at least a discharge gap is maintained between the flush member and the outer seal element. Thus the movement of the flush member to the extended position is operable to contact excreta which has collected in the transport conduit under the commode opening and push the material out of the discharge end of the transport conduit where the material may fall into the holding tank through the discharge gap between the flush member and outer seal element. Once the flush member has reached its extended position to discharge excreta from the transport conduit, the flush cycle includes moving the flush member back to the retracted position and moving the outer seal element back to the sealing position.

These and other advantages and features of the invention will be apparent from the following description of illustrative embodiments, considered along with the accompanying drawings.

DESCRIPTION OF ILLUSTRATIVE EMBODIMENTS

Figure 1:
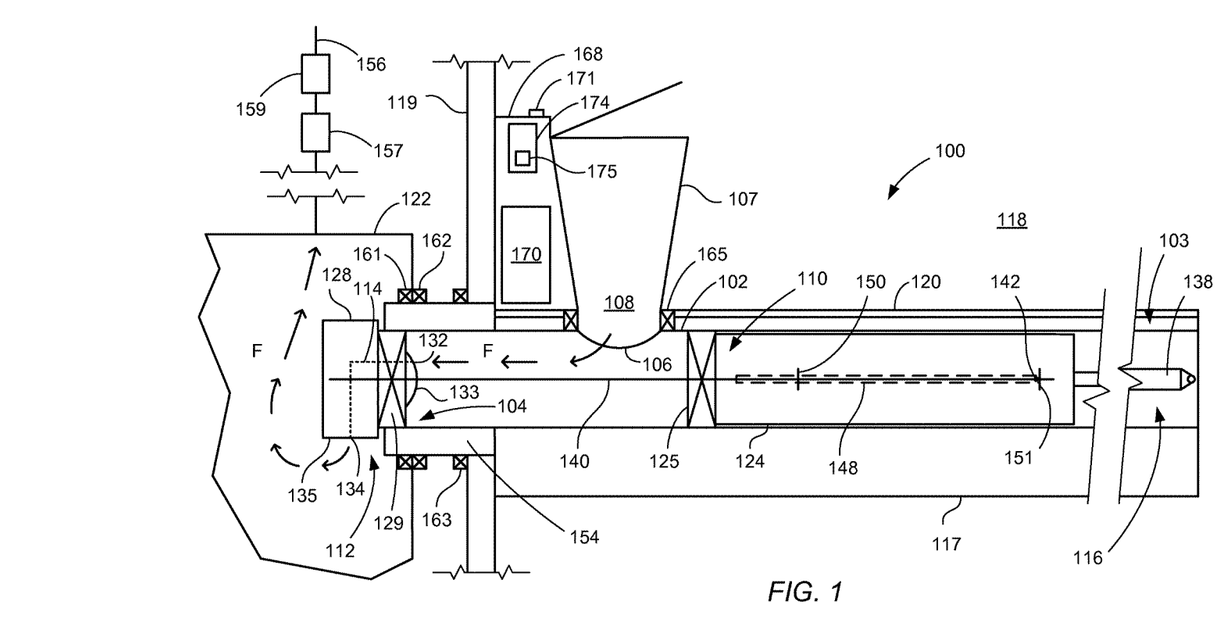
FIG. 1 is a diagrammatic side view representation of a toilet system embodying principles of the present invention, showing the flush member of the system in the retracted position and the outer seal element in the sealing position.
Figure 2:
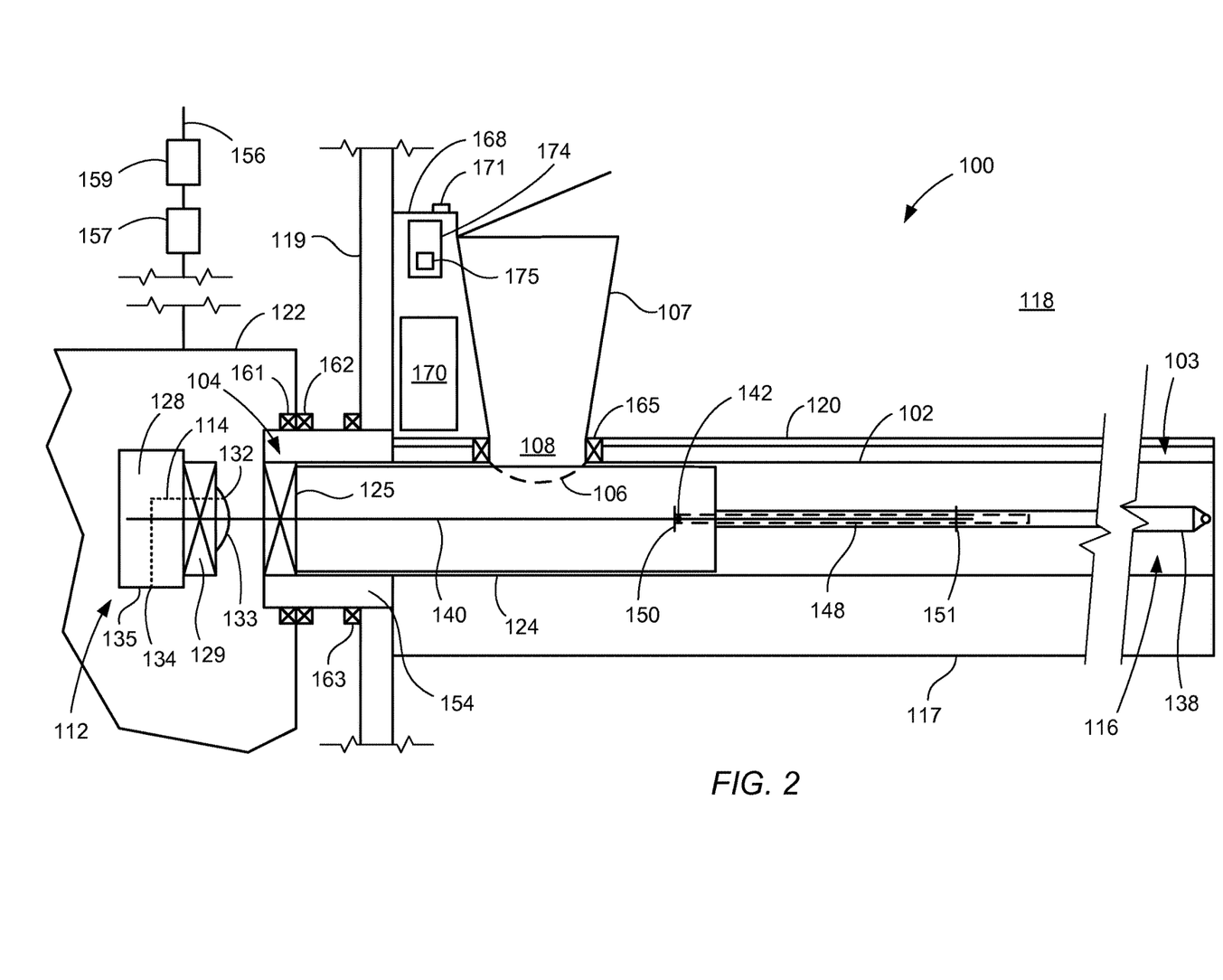
FIG. 2 is a diagrammatic side view representation similar to FIG. 2 showing the flush member in the extended position and the outer seal element in the displaced position.
Figure 3:
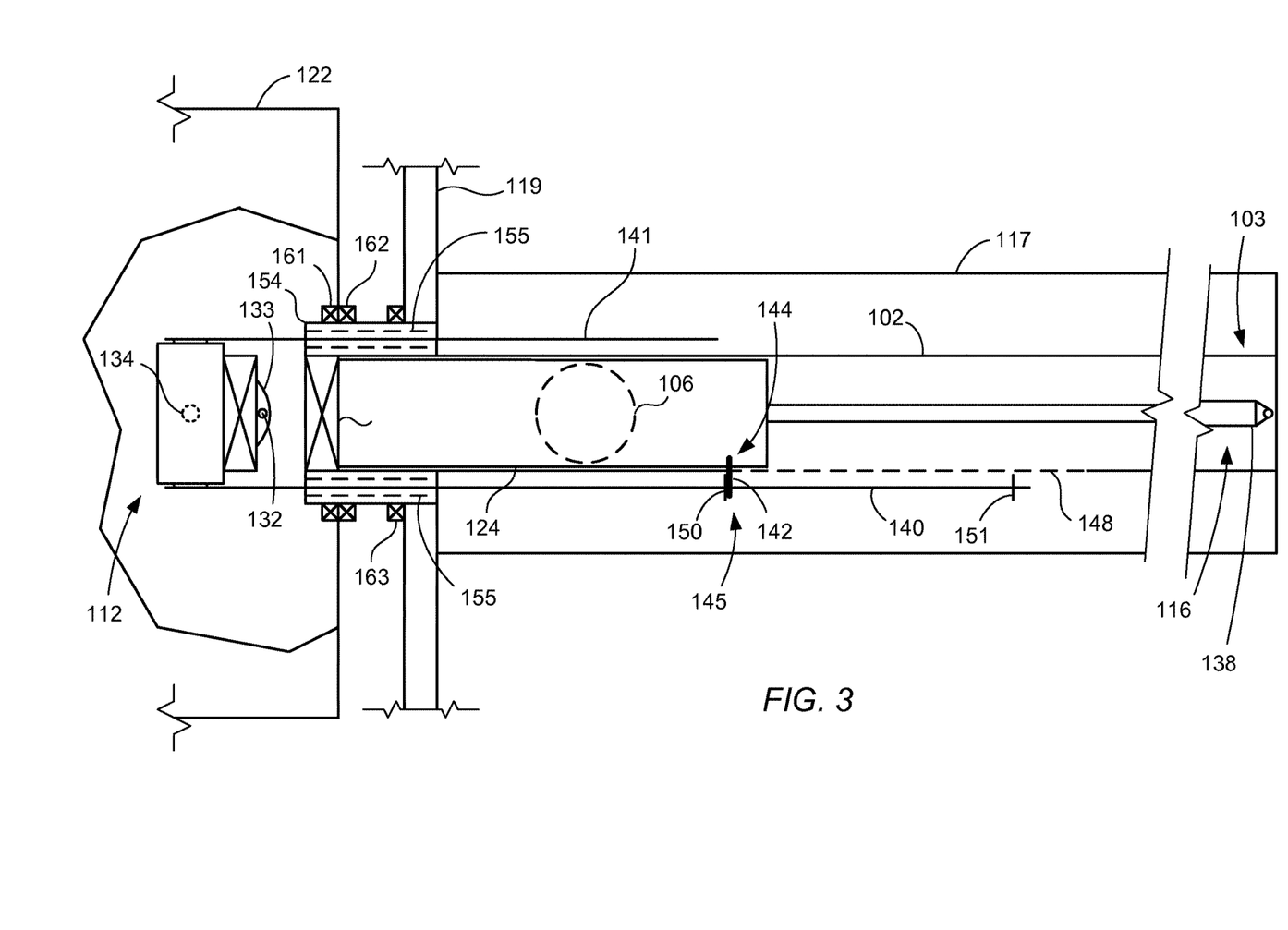
FIG. 3 is a diagrammatic top view representation showing the flush member in the extended position and outer seal element in the displaced position.

The following disclosure will describe a toilet system within the scope of the present invention with reference to a first embodiment illustrated in FIGS. 1-3. FIGS. 1-3 will also be used to describe the operation of the illustrated toilet system through the flush cycle. FIGS. 4-7 will be used to describe additional details and features which may be incorporated in a toilet system within the scope of the present invention.

Referring particularly to FIGS. 1 and 2, a toilet system 100 embodying principles of the invention includes a transport conduit 102 which extends essentially horizontally in the orientation of the figures from an inner end shown at reference numeral 103 to a discharge end shown generally at reference numeral 104. Transport conduit 102 includes a commode opening 106 located between inner end 103 and discharge end 104. A commode 107 is located above commode opening 106 with a lower opening 108 generally aligned with the commode opening. Toilet system 100 also includes a flush member 110, an outer seal element 112, one or more ventilation passages 114 through the outer seal element, and an actuator system shown generally at reference numeral 116. In the example illustrated in FIGS. 1-3, transport conduit 102, flush member 110, outer seal element 112, and actuator system 116 are all mounted on a support structure shown diagrammatically at reference numeral 117. This support structure 117 is shown positioned in a toilet room 118 of a building adjacent to an exterior wall 119 of the building and with floor decking 120 providing a flooring surface for a portion of the toilet room. Transport conduit discharge end 103 extends through a suitable opening in exterior wall 119 and into a suitable opening of a holding tank 122 located beyond the exterior wall.

Flush member 110 in the embodiment of FIGS. 1-3 includes a tubular body 124 having a seal structure 125 mounted at the end (sealing end) of the tubular body facing discharge end 104 of transport conduit 102. The function of the flush member seal structure 125 is to provide a continuous and robust circumferential seal between flush member 110 and the inner surfaces of transport conduit 102. These inner surfaces of transport conduit 102 are preferably made of or coated with a suitable friction reducing material such as Teflon® ploytetrafluoroethylene to reduce friction cause by the contact between flush member seal structure 125 and the inner surfaces of transport conduit 102. The seal elements of flush member seal structure 125 may also include suitable friction reducing coatings or materials.

Outer seal element 112 is located in holding tank 122 at transport conduit discharge end 104, and includes an outer seal body 128 carrying an outer seal structure 129. Outer seal structure 129 is adapted to provide a circumferential seal between outer seal element 112 and the inner surfaces of transport conduit 102 when the outer seal element is in the sealing position shown in FIG. 1. As with flush member seal structure 125, outer seal structure 129 may include suitable friction reducing coatings or materials to facilitate the required movement of outer seal element 112 with respect to transport conduit 102. Ventilation passage 114 through outer seal element 112 includes at least inner one opening 132 on an inside surface 133 of outer seal body 128 and at least one outer opening 134 on an outside surface 135 of the outer seal body. Thus when outer seal element 112 is in the sealing position shown in FIG. 1, ventilation passage 114 provides fluid communication from the volume defined inside transport conduit 102 to the volume defined inside holding tank 122.

The actuator system in the embodiment illustrated in FIGS. 1-3 includes a linear actuator 138 which is connected to operate between support structure 117 and flush member 110. The illustrated actuator arrangement also includes two guide rods which are located on either side of transport conduit 102 as shown in FIG. 3. The two guide rods include a drive guide rod 140 and a follower guide rod 141 as shown in FIG. 3, with an outer end of each connected to the outer seal body 128. Drive guide rod 140 represents a member providing a mechanical connection to outer seal element 112 which allows the outer seal element to be driven through its range of movement in the operation of toilet system 100 as described further below. Both guide rods 140 and 141 are slideably mounted with respect to transport conduit 102 so that they may reciprocate along a respective axis parallel to an axis of the transport conduit (an extension axis, which comprises the longitudinal axis of the transport conduit in this embodiment). Drive guide rod 140 is also connected to flush member 110 through a slide connection. In particular, a slide pin 142 is connected at a first end to flush member 110 and includes a rod receiving opening at its second end through which drive guide rod 140 is received. The location of the slide pin connection to the flush member is shown generally at reference numeral 144 in FIG. 3, and the location of the slide opening through which the drive guide rod is received in shown generally at reference numeral 145 in FIG. 3. In order to reach from the connection to flush member 110 to drive guide rod 140, slide pin 142 extends transversely through an elongated slot formed in the side of transport conduit 102. This elongated slot 148 is shown in dashed lines in the figures. An extension stop 150 and a retraction stop 151 on drive guide rod 140 cooperate with slide pin 142 to allow the single linear actuator 138 to drive the movement of both flush member 110 and outer seal element 112 in the flush cycle as will be described further below in the description of the flush cycle. In particular, the connection between flush member 110 and actuator 138 represents a first mechanical connection which allows the actuator to move the flush member in the flush cycle, while the further mechanical connection to drive guide rod 140 via slide pin 142 represents a second mechanical connection which allows the actuator to also move outer seal element 112 in the flush cycle.

In the example illustrated in FIGS. 1-3, a guide collar 154 is mounted about the circumference of transport conduit 102 at the discharge end 103 of the transport conduit. Guide collar 154 includes guide openings 155 shown in dashed lines in FIG. 3 through which guide rods 140 and 141 are slideably and sealing received. These guide openings serve to support the end of guide rods 140 and 141 connected to outer seal element 112 and allow the guide rods to hold the outer seal element in the desired positions within holding tank 122.

Holding tank 122 includes a ventilation stack 156 (conduit) through which gas and vapors may exit the holding tank. A suitable fan 157 may be included in ventilation stack 156 to draw gas and vapors from holding tank 122. Fan 157 is preferably an electrically powered fan which operates off electrical power provided by a photovoltaic solar power system (not shown) or by a standard electric power distribution system (also not shown). A suitable filter device 158 such as an activated carbon filter may be included in ventilation stack 156 to filter gas and vapor exiting holding tank.

A number of additional seal elements are included in the system illustrated in FIGS. 1-3 to ensure that gas and vapors are released from the toilet system only through ventilation stack 156 from holding tank 122. In this illustrative example, inner and outer tank seal elements, 161 and 162 respectively, are provided at the periphery of guide collar 154 to provide a circumferential seal between the guide collar and holding tank 122. A wall seal element 163 is also provided to provide a circumferential seal between guide collar 154 and exterior wall 119 at the wall opening through which the guide collar and transport conduit 102 extend. Another seal element 165 is included in system 100 to provide a circumferential seal at the connection between commode 107 and commode opening 106 of transport conduit 102.

It will be appreciated that the actuator system 116 included in toilet system 100 will include means for supplying driving power for linear actuator 116. In the embodiment shown in FIGS. 1-3, linear actuator 116 comprises an electrically powered actuator with an electric motor (not shown) which provides the motive force for moving the various components through the flush cycle. An enclosure 168 located behind commode 107 in FIGS. 1 and 2 provides a location for control components and perhaps monitoring components included in the toilet system together with suitable power supplies for the control components and monitoring components. In particular, enclosure 168 houses a controller 170 which controls linear actuator 138 in response to a user input entered through an input device. In this example, the input device may comprise a suitable switch illustrated diagrammatically at 171 in FIGS. 1 and 2. Enclosure 168 also may house a monitoring device 174 which monitors the operation of the controller and any other electronic components of toilet system 100. Monitoring device 174 may include a transmitter 175 which may transmit (wirelessly or otherwise) status signals and particularly malfunction alerts to a remote monitoring device (not shown).

The operation of toilet system 100 through the flush cycle may now be described with reference to FIGS. 1-3. From the position shown in FIG. 1, actuator 138 is controlled to extend and thereby push the flush member 110 toward transport conduit discharge end 104 (to the left in the orientation of the figures). As flush member 110 is driven toward discharge end 104, slide pin 142 moves along with the flush member toward the discharge end of transport conduit 102, with the slide pin sliding through slot 148 formed in the transport conduit. As slide pin 142 moves from its terminal position at the right of slot 148 shown in FIG. 1, it slides along the length of drive guide rod 140 toward the location of extension stop 150 on the drive guide rod. During the time that slide pin 142 is sliding along drive guide rod 140, the drive guide rod remains in the position shown in FIG. 1 and thus outer seal element 112 also remains in the position shown in FIG. 1. However, when slide pin 142 reaches extension stop 150 on drive guide rod 140, the contact between the slide pin and extension stop forces the drive guide rod to the left in the figures. This movement of the drive guide rod to the left in the figures moves outer seal element 112 from the position shown in that figure, until the outer seal element ultimately reaches the position shown in FIGS. 2 and 3. In this embodiment for actuator system 116, the distance outer seal element 112 moves from the sealing position shown in FIG. 1 and the displaced position shown in FIGS. 2 and 3 is defined by the distance between the extension stop in the position of FIG. 1 and the left end of elongated slot 148 through which the slide pin travels (or left-most extent of travel of slide pin 142 if the left-most extent of travel is not defined by slot 148).

It will be appreciated that as flush member 110, and particularly flush member seal structure 125 moves beneath commode opening 106, the flush member pushes excreta that has collected in the transport conduit toward transport conduit discharge end 104. Ultimately, when flush member 110 reaches discharge end 104, excreta which has been pushed ahead of the flush member drops into holding tank 122. Prior to the point at which flush member 110 reaches transfer conduit discharge end 104, drive guide rod 140 begins to move outer seal element 112 from its sealing position shown in FIG. 1. This displacement of outer seal element 112 prior to flush member 110 reaching its fully extended position maintains the discharge gap between the flush member and the outer seal element so that the outer seal element does not interfere with the movement of excreta out of the transfer conduit discharge end 104 and into holding tank 122, and also helps prevent the inner surfaces of outer seal element 112 from being soiled with excreta. The length of the discharge gap may be any length that ensures that outer sealing element 112 does not interfere significantly with the discharge of excreta from transport conduit 102 to holding tank 122, and may be from two to eight inches, for example.

Because flush member 110 is manipulated in toilet system 100 to push excreta from transport conduit out of discharge end 104, the extended position of the flush member preferably places the face of seal structure 125 (the left-most face in the orientation of FIGS. 1-3) approximately at discharge end 104. This position approximately at discharge end 104 may be slightly past the discharge end (to the left in the figure), flush with the discharge end, or even slightly short (to the right in the figures) of the discharge end. As used in this disclosure and the accompanying claims a position "approximately at the discharge end 104 of transport conduit 102" is a position which ensures the bulk of excreta pushed ahead of flush member 110 in a flush cycle is discharged from the discharge end of the transport conduit.

The flush cycle is completed by reversing the movement of flush member 110 and outer seal element 112. Starting from the position shown in FIGS. 2 and 3, linear actuator 138 is reversed so as to pull flush member 110 back toward the transport conduit inner end 103, to the right and the figures. As flush member 110 moves toward transport conduit inner end 103, slide pin 142 also moves along elongated slot 148 toward inner end 103, with the guide rod receiving opening end of the slide pin sliding along drive guide rod 140 until reaching retraction stop 151. Once slide pin 142 reaches retraction stop 151, the further movement of the slide pin to the right in the orientation of the figures pulls drive guide rod 140 also to the right, in the direction toward transport conduit inner end 103. This movement of drive guide rod 140 to the right in the orientation of the figures pulls outer seal element 112 to the right and ultimately into the sealing position shown in FIG. 1.

It will be noted that in the sealing position of outer seal element 112 shown in FIG. 1, ventilation passage 114 provides a channel by which gas and vapors within the interior of transport conduit 102 may be drawn from the interior of the transport conduit and into holding tank 122. Fan 157 operates to induce this flow through ventilation passage 114 from the interior of transport conduit 102 to holding tank 122. The line of arrows F shown in FIG. 1 indicates the flow path of gas and vapor through commode opening 106, interior of transport conduit 102, ventilation passage 114, and then holding tank 122 to be expelled through holding tank ventilation stack 156.

Figure 4:
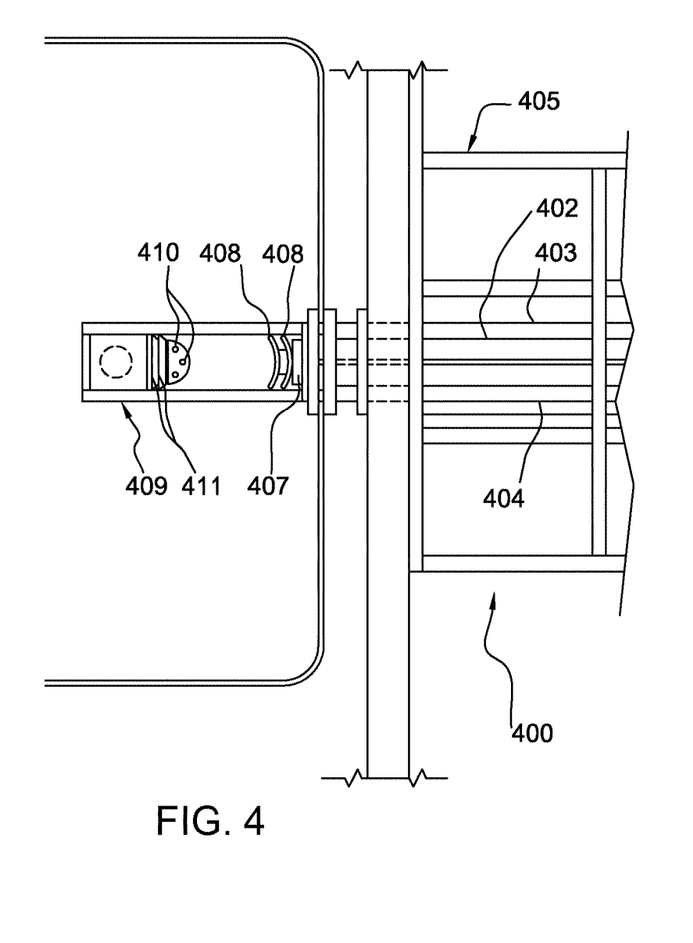
FIG. 4 is a diagrammatic top view of a portion of a second embodiment of a toilet system according to the present invention.

FIG. 4 shows a portion of an alternative toilet system 400 including a portion of the transport conduit 402 and portions of the guide rods 403 and 404. FIG. 4 also shows portions of a support structure 405. This support structure 405 may be conveniently built from 2X lumber joined in a suitable fashion and having openings formed for elements such as the transport conduit and guide rods.

The seal structure for flush member 407 shown in FIG. 4 includes two concave seal elements 408. The alternative outer seal element 409 shown in FIG. 4 includes multiple input openings 410 for the ventilation passage through the outer seal element and also an arrangement of two beveled seal elements 411 to provide the desired circumferential seal against the transport conduit when the outer seal element is in the sealing position.

Figure 5:
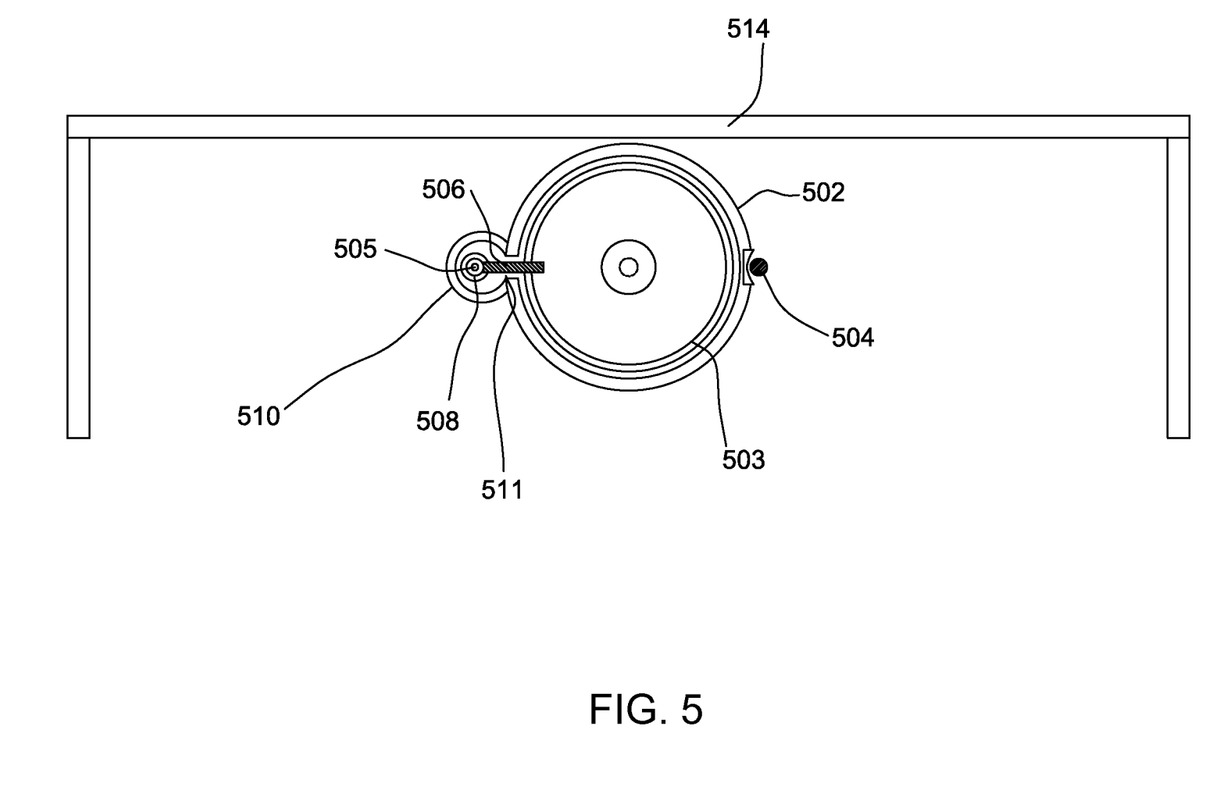
FIG. 5 is a diagrammatic section view showing a portion of another embodiment of the invention.

FIG. 5 shows a partial transverse section view of a transport conduit 502 and flush member 503 of another alternative toilet system embodying the principles of the invention. The section view of FIG. 5 shows a follower guide rod 504 and a drive guide rod 505. A slide pin 506 is connected at its first end to flush member 503, with the drive guide rod 505 received through a rod receiving opening 508 at the opposite end of the slide pin. In this alternative embodiment drive guide rod 505 is encased in a barrel 510 which is secured to the outside of transport conduit 502 in position to cover the elongated slot 511 through which slide pin 506 reciprocates in the flush cycle. FIG. 5 also shows a portion of the support structure for the toilet system including floor decking 514.

Figure 6:
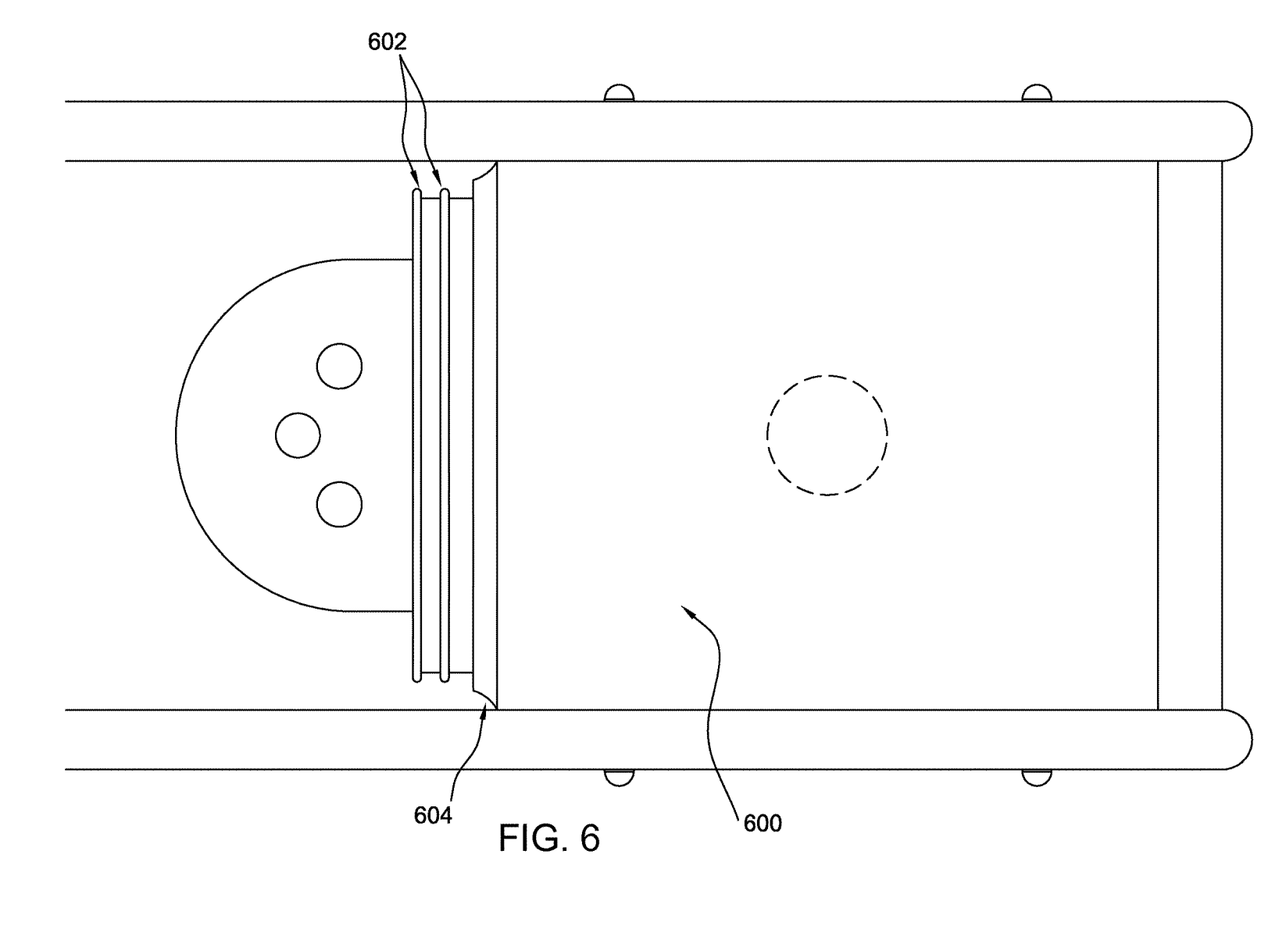
FIG. 6 is a diagrammatic top view of an alternate outer seal element within the scope of the invention.

FIG. 6 shows another alternative outer seal element 600 which may be used in embodiments of the present invention. This embodiment of the outer seal element includes three inlet openings to the ventilation passage similar to the outer seal element shown in FIG. 4. However, the seal structure for outer seal element 600 in FIG. 6 includes double O-ring type seal elements 602 and a beveled seal element 604. O-ring seal elements 602 are adapted to slide into the discharge end of the transport conduit of the system, while beveled seal element 602 is adapted to provide a circumferential seal at the discharge end of the transport conduit.

Figure 7:
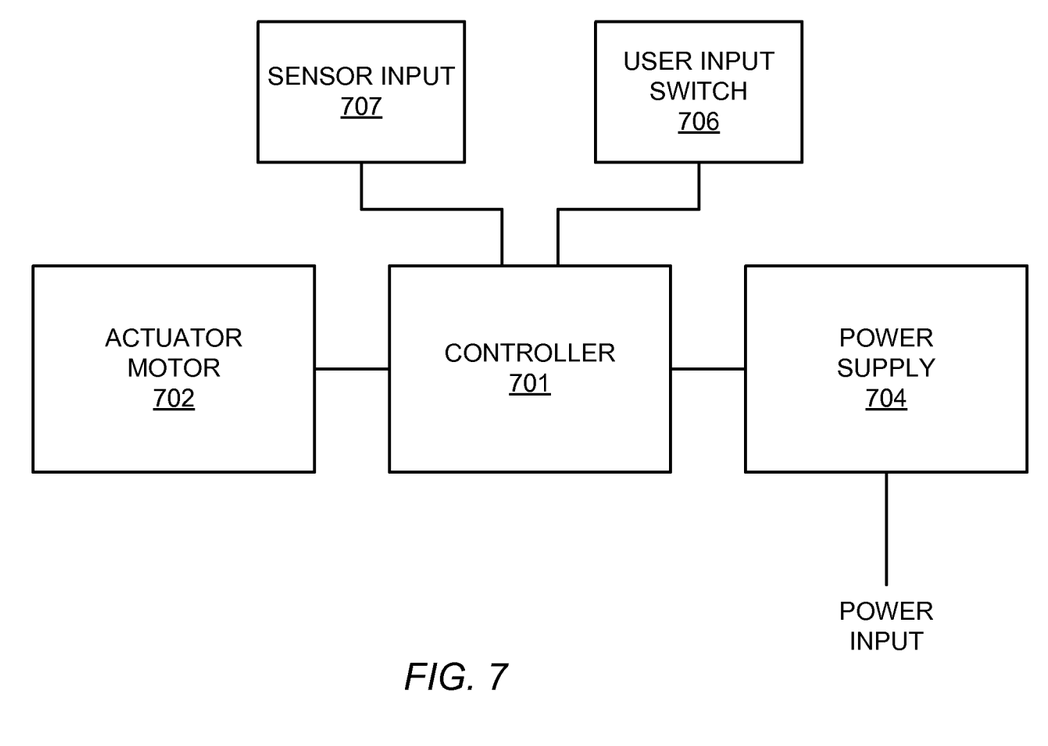
FIG. 7 is a block diagram showing an arrangement of electrical components which may be included in a toilet system in accordance with the present invention.

FIG. 7 shows a block diagram of the electronic portion of an actuator system such as actuator system 116 shown in FIGS. 1-3. This electronic portion of the actuator system includes a controller 701 (corresponding to controller 170 in FIGS. 1 and 2) for driving an actuator motor 702. A power supply 704 receives input power and provides a suitable power input to controller 701. User input device or switch 706 may be operated by a user to provide an input signal to controller 701 to initiate the flush cycle described above. The example arrangement of FIG. 7 also shows a sensor input 707 to controller 701. Numerous different types of sensor or switch inputs may be used by the controller to control the operation of actuator motor 702. For example because it is desirable that no waste be deposited in the commode over the course of the flush cycle, a suitable commode cover sensor may be present to detect an open condition for a commode cover, and controller 701 may use the open condition detection to prevent the initiation of a flush cycle. Thus controller 701 would respond to an input from switch 706 to initiate a flush cycle only when the commode cover is in the closed position. In the event a flush cycle is in progress and the commode cover is opened, the controller may use the commode cover sensor input to immediately abort the flush cycle and cause actuator motor 702 to return the flush member to the retracted position.

Controller 701 is preferably housed in a moisture-proof housing at a convenient location in the toilet system. As noted above in connection with FIGS. 1 and 2, enclosure 168 in those figures provides a convenient location for the controller and the moisture-roof housing in which it is contained. Power supply 104 may also be housed within an enclosure such as enclosure 168 shown in FIGS. 1 and 2, however, the power supply will typically require airflow for cooling, and thus may not be enclosed in a moisture-proof enclosure. It will be appreciated that the electronic circuits included in a toilet system according to the present invention will be arranged according to applicable regulatory codes and may include safety devices not shown FIG. 7 such as circuit breakers and fuses. For example, NFPA 70 may be followed for all electrical components, electrical connections, system installation, and system operation. Electrical safety devices included in the toilet system may be housed in the same compartment used for controller 701 and power supply 704, such as an enclosure behind the commode (enclosure 168 shown in FIGS. 1 and 2, for example).

The invention encompasses numerous variations in the various components described above. For example, any suitable controller or control scheme may be used to control the movement of the flush member and outer seal element through the flush cycle. For example, a controller may rely on sensors associated with the transport conduit or flush member to detect the position of the flush member relative to the transport conduit and control the movement of the flush member accordingly. Alternatively, an indexing scheme implemented by the actuator may be used to determine the relative position of the flush member throughout the flush cycle. The invention is also not limited to the linear actuator illustrated for purposes of example in FIGS. 1-3. Any suitable actuator device may be used to produce the desired movement, including a scissor mechanism or a ball screw actuator for example. Any such mechanism may be hand cranked rather that electrically powered. Additionally, any suitable seal elements may be used for the seals provided in the toilet system. It should also be noted that although the embodiment of FIGS. 1-3 is shown with the toilet system adjacent to an exterior wall of the toilet room, it is possible that the wall may be an interior wall and that the holding tank or at least the top of the holding tank is located in a closet or other area actually within the same building envelope as the toilet room. Of course the holding tank ventilation stack in this latter arrangement would still vent to the exterior environment.

Another variation on the embodiment shown in FIGS. 1-3 relates to the actuator system for moving the outer seal element between its sealing and displaced positions. In alternative embodiments, the actuator system may drive both guide rods to move the outer seal element. For example, follower guide rod 141 shown in FIG. 3 may be replaced with a drive guide rod on that side of the transport conduit, similar to drive guide rod 140, and being driven by a similar linkage to the flush member, that is, a slide pin arrangement similar to the arrangement for slide pin 142. Also, although the illustrated forms of the invention use a single actuator for imparting the desired movement for both the flush member and outer seal element, other actuator systems within the scope of the invention may include two actuators, one for driving the flush member and another for driving the outer seal element.

As used herein, whether in the above description or the following claims, the terms "comprising," "including," "carrying," "having," "containing," "involving," and the like are to be understood to be open-ended, that is, to mean including but not limited to. Any use of ordinal terms such as "first," "second," "third," etc., in the claims to modify a claim element does not by itself connote any priority, precedence, or order of one claim element over another, or the temporal order in which acts of a method are performed. Rather, unless specifically stated otherwise, such ordinal terms are used merely as labels to distinguish one claim element having a certain name from another element having a same name (but for use of the ordinal term).

The above described preferred embodiments are intended to illustrate the principles of the invention, but not to limit the scope of the invention. Various other embodiments and modifications to these preferred embodiments may be made by those skilled in the art without departing from the scope of the present invention.

The invention claimed is:

1. A toilet system including:
   (a) a support structure;
   (b) a transport conduit mounted on the support structure, the transport conduit including a discharge end, an inner end, and a commode opening located between the discharge end and inner end;
   (c) a flush member positioned within the transport conduit and being movable between a retracted position and an extended position, wherein in the retracted position a sealing end of the flush member resides between the commode opening and the inner end of the transport conduit and in the extended position the sealing end of the flush member resides approximately at the discharge end of the transport conduit;
   (d) an outer seal element mounted on the support structure and being movable between a sealing position and a displaced position, wherein in the sealing position the outer seal element seals the discharge end of the transport conduit and in the displaced position the outer seal element is separated from the discharge end of the transport conduit;
   (e) one or more ventilation passages in the outer seal element, each ventilation passage extending through the outer seal element to enable airflow there through from an interior of the transport conduit when the outer seal element is in the sealing position; and
   (f) an actuator system mounted on the support structure and operatively connected to the flush member and to the outer seal element, the actuator system being operable to move the flush member and the outer seal element in a flush cycle in which (i) at least a discharge gap is maintained between the flush member and the outer seal element as the flush member moves from the retracted position to the extended position and the outer seal element moves from the sealing position to the displaced position, and (ii) the flush member then moves back to the retracted position and the outer seal element moves back to the sealing position.

2. The toilet system of claim 1 further including a controller mounted on the support structure, the controller being adapted to control the actuator system to move the flush member and outer seal element through the flush cycle in response to a user input received through a user input device.

3. The toilet system of claim 2 further including:
   (a) a floor structure mounted on the support structure in a position above the transport conduit; and
   (b) a commode mounted on the floor structure and having a lower opening connected to the commode opening of the transport conduit.

4. The toilet system of claim 1 wherein the operative connection to the outer seal element includes a member which is (i) connected to the outer seal element and (ii) connected to be driven by an actuator of the actuator system to move the outer seal element between the sealing position and the displaced position.

5. The toilet system of claim 1 wherein the outer seal element is mounted on the support structure through two laterally spaced apart and parallel guide rods, the guide rods being movable with respect to the support structure and the transport conduit along an extension axis defined through the transport conduit in the direction from the inner end to the discharge end of the transport conduit.

6. The toilet system of claim 5 wherein the actuator system includes a linkage between at least one of the guide rods and the flush member or an element which moves with the flush member in the flush cycle.

7. The toilet system of claim 6 wherein:
   (a) the transport conduit includes an elongated slot formed in one side thereof;
   (b) the linkage includes a slide pin which extends transversely through the elongated slot;
   (c) the slide pin has a first end connected to the flush member and a second end having a rod receiving opening;
   (d) one of the guide rods is slideably received through the rod receiving opening; and
   (e) the guide rod received through the rod receiving opening includes an extension stop and a retraction stop which define the length that the slide pin may slide along that guide rod.

8. The toilet system of claim 7 further including a guide collar mounted on the outside surface of the transport conduit at the discharge end thereof and wherein each guide rod extends through a respective opening in the guide collar.

9. The toilet system of claim 1 further including:
   (a) a holding tank having an inlet opening through which is received the discharge end of the transport conduit and the outer seal element;
   (b) a ventilation stack connected to the holding tank;
   (c) a fan connected to the ventilation stack and being operable to induce airflow from the holding tank to an outlet of the ventilation stack.

10. A toilet system including:
    (a) a transport conduit including a discharge end, an inner end, and a commode opening located between the discharge end and inner end;
    (b) a flush member positioned within the transport conduit and being movable between a retracted position and an extended position, wherein in the retracted position a sealing end of the flush member resides between the commode opening and the inner end of the transport conduit and in the extended position the sealing end of the flush member resides approximately at the discharge end of the transport conduit;

(c) an outer seal element being movable between a sealing position and a displaced position, wherein in the sealing position the outer seal element seals the discharge end of the transport conduit and in the displaced position the outer seal element is separated from the discharge end of the transport conduit;

(d) one or more ventilation passages in the outer seal element, each ventilation passage extending through the outer seal element to enable airflow there through from an interior of the transport conduit when the outer seal element is in the sealing position; and (e) an actuator system operatively connected to the flush member and to the outer seal element, the actuator system being operable to move the flush member and the outer seal element in a flush cycle in which (i) at least a discharge gap is maintained between the flush member and the outer seal element as the flush member moves from the retracted position to the extended position and the outer seal element moves from the sealing position to the displaced position, and (ii) the flush member then moves back to the retracted position and the outer seal element moves back to the sealing position.

11. The toilet system of claim 10 further including a controller adapted to control the actuator system to move the flush member and outer seal element through the flush cycle in response to a user input received through a user input device.

12. The toilet system of claim 10 wherein the outer seal element is mounted on two laterally spaced apart and parallel guide rods, the guide rods being movable with respect to the transport conduit along an extension axis defined through the transport conduit in the direction from the inner end to the discharge end of the transport conduit.

13. The toilet system of claim 12 wherein the actuator system includes a linkage between at least one of the guide rods and the flush member or an element which moves with the flush member in the flush cycle.

14. The toilet system of claim 13 wherein:
(a) the transport conduit includes an elongated slot formed in one side thereof;
(b) the linkage includes a slide pin which extends transversely through the elongated slot;
(c) the slide pin has a first end connected to the flush member and a second end having a rod receiving opening;
(d) one of the guide rods is slideably received through the rod receiving opening; and
(e) the guide rod received through the rod receiving opening includes an extension stop and a retraction stop which define the length that the slide pin may slide along that guide rod.

15. The toilet system of claim 14 further including a guide collar mounted on the outside surface of the transport conduit at the discharge end thereof and wherein each guide rod extends through a respective opening in the guide collar.

16. A method including:
(a) moving a flush member within a transport conduit from a retracted position at an inner end of the transport conduit to an extended position in which the flush member resides approximately at a discharge end of the transport conduit opposite the inner end;
(b) moving an outer seal element from a sealing position forming a seal at the discharge end of the transport conduit to a displaced position separate from the discharge end of the transport conduit, the movement of the outer seal element from the sealing position to the displaced position being performed so as to maintain at least a discharge gap between the flush member and the outer seal element as the flush member moves from the retracted position to the extended position;
(c) moving the flush member from the extended position to the retracted position and moving the outer seal element from the displaced position to the sealing position; and
(d) while the outer seal element is in the sealing position, inducing airflow through a ventilation passage in the outer seal element from an interior space of the transport conduit.

17. The method of claim 16 wherein the discharge end of the transport conduit is connected to a holding tank and the airflow through the ventilation passage in the outer seal element is induced with a fan mounted on a ventilation stack of the holding tank.

18. The method of claim 16 wherein:
(a) the flush member is moved between the retracted position and the extended position through a first mechanical connection to an actuator; and
(b) the outer seal element is moved between the sealing position and the displaced position through a second mechanical connection to the actuator.

19. The method claim 16 further including supporting the outer seal element on two guide rods extending parallel to the transport conduit.

* * * * *